(12) United States Patent
Mantri et al.

(10) Patent No.: US 9,276,741 B2
(45) Date of Patent: Mar. 1, 2016

(54) CONTENT ENCRYPTION KEY MANAGEMENT

(75) Inventors: Siddharth Mantri, Seattle, WA (US); David E. W. Mercer, Bothell, WA (US); Ajay S. Kang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 507 days.

(21) Appl. No.: 13/526,325

(22) Filed: Jun. 18, 2012

(65) Prior Publication Data
US 2013/0266138 A1    Oct. 10, 2013

Related U.S. Application Data

(60) Provisional application No. 61/622,410, filed on Apr. 10, 2012.

(51) Int. Cl.
| H04L 9/00 | (2006.01) |
| H04L 9/08 | (2006.01) |
| G06F 21/10 | (2013.01) |
| H04L 29/06 | (2006.01) |
| H04N 21/258 | (2011.01) |
| H04N 21/266 | (2011.01) |
| H04N 21/8352 | (2011.01) |
| H04N 21/478 | (2011.01) |

(52) U.S. Cl.
CPC .............. H04L 9/0869 (2013.01); G06F 21/10 (2013.01); H04L 9/0866 (2013.01); H04L 9/0894 (2013.01); H04L 63/06 (2013.01); H04L 63/10 (2013.01); H04N 21/25875 (2013.01); H04N 21/26613 (2013.01); H04N 21/8352 (2013.01); *H04L 2463/101* (2013.01); *H04N 21/4781* (2013.01)

(58) Field of Classification Search
CPC . G06F 21/6209; H04L 9/0894; H04L 9/0866; H04L 9/0869
See application file for complete search history.

(56) References Cited

U.S. PATENT DOCUMENTS

| 7,484,097 B2 | 1/2009 | Steiger et al. |
| 2002/0018571 A1 | 2/2002 | Anderson et al. |

(Continued)

OTHER PUBLICATIONS

Dutta et al. (Key Management in Multi-Distributor based DRM System with Mobile Clients using IBE), 2009, Retrieved from the Internet <URL: ieeexplore.ieee.org/xpls/abs_all.jsp?arnumber=5273858>, pp. 1-6 as printed.*

(Continued)

*Primary Examiner* — Michael Chao
(74) *Attorney, Agent, or Firm* — Timothy Churna; Judy Yee; Micky Minhas

(57) ABSTRACT

Systems and methods for managing a content encryption key and a seed to generate the content encryption key are provided. In one example, a method may include receiving a request for a content encryption key at a content encryption key service. The request includes a requesting entity fingerprint that corresponds to a requesting entity and a seed identifier that corresponds to a seed. The seed identifier is mapped to the seed and the requesting entity fingerprint mapped to a corresponding seed permission. If the seed permission entitles the requesting entity to receive the content encryption key, the key is derived using the seed and provided to the requesting entity.

18 Claims, 4 Drawing Sheets

(56) References Cited

U.S. PATENT DOCUMENTS

| | | | |
|---|---|---|---|
| 2004/0128499 A1 | 7/2004 | Peterka et al. | |
| 2006/0053080 A1 | 3/2006 | Edmonson et al. | |
| 2007/0130472 A1* | 6/2007 | Buer et al. | 713/182 |
| 2009/0113537 A1* | 4/2009 | Woo | 726/12 |
| 2011/0010541 A1 | 1/2011 | Robert et al. | |

OTHER PUBLICATIONS

Chen et al. (Legitimate Peer-to-Peer Content Distribution Network), 2006, Retrieved from the Internet <URL: ieeexplore.ieee.org/xpls/abs_all.jsp?arnumber=4031541>, pp. 1-4 as printed.*

RFC 4211, (Internet X.509 Public Key Infrastructure Certificate Request Message Format (CRMF)>, 2005, Retrieved from the Internet <URL: .ietf.org/rfc/rfc4211.txt>, pp. 1-40 as printed.*

"Vormetric Keeps All Encryption Keys in One Safe Place", Retrieved at <<http://www.darkreading.com/authentication/167901072/security/news/232200198/vormetric-keeps-all-encryption-keys-in-one-safe-place.html>>, Nov. 23, 2011, pp. 3.

Mattsson, Ulf T., "Key Management for Enterprise Data Encryption", Retrieved at <<http://xml.coverpages.org/Mattsson-SSRN-id1051481.pdf>>, Dec. 3, 2007, pp. 7.

* cited by examiner

CONTENT ENCRYPTION KEY MANAGEMENT

CROSS REFERENCE TO RELATED APPLICATIONS

This application claims priority to U.S. Provisional Patent Application Ser. No. 61/622,410 filed on Apr. 10, 2012 and entitled "Content Encryption Key Management," the entirety of which is hereby incorporated by reference for all purposes.

BACKGROUND

Content delivery services typically provide encrypted digital content, such as videos, music, movies, video games, etc., to various receiving entities requesting such content. To encrypt such content, the content delivery service may utilize one or more cryptographic algorithms that utilize cryptographic keys, such as symmetric keys and asymmetric keys, to encrypt and decrypt the content. In some examples, the cryptographic keys may be derived by inputting a cryptographic seed into the cryptographic algorithm. In many environments, and particularly where the sensitivity and business value of the digital content is high, such cryptographic seeds may have a correspondingly high business value that warrants high levels of security to protect the seeds.

Managing the use, storage and overall security of multiple cryptographic seeds within an enterprise may present challenges. In some examples, a content delivery service may include various content-related workflows that utilize cryptographic seeds. Typically, such content delivery services physically duplicate the cryptographic seeds that are used to derive content encryption keys across the various workflows. Such physical duplication of the cryptographic seeds results in increasing the risk surface area that is exposed to potential security breaches and leaks of the seeds. Additionally, systems that secure two physical copies of the cryptographic seeds in two separate locations employ duplicate security measures for each location, thereby increasing system expenses and complexities.

In some examples an enterprise may have two or more content delivery services that each utilizes specific protection schemes for protecting cryptographic seeds and other sensitive content-related assets. In these examples, the multiple protection schemes may have varying levels of robustness that, when combined, reduce the overall level of system security.

SUMMARY

To address the above issues, systems and methods for managing a content encryption key and a seed that is used to generate the content encryption key are provided. In one example the method may include, at a content encryption key service, receiving a request for the content encryption key. The request may include a requesting entity fingerprint that corresponds to a requesting entity and a seed identifier that corresponds to the seed. The method may include mapping the seed identifier to the seed, and mapping the requesting entity fingerprint to a corresponding seed permission in a permissions table.

The method may further include determining whether the corresponding seed permission entitles the requesting entity to receive the content encryption key that is generated using the seed. Where the corresponding seed permission entitles the requesting entity to receive the content encryption key that is generated using the seed, the method may include deriving the content encryption key using the seed. The method may then include providing the content encryption key to the requesting entity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
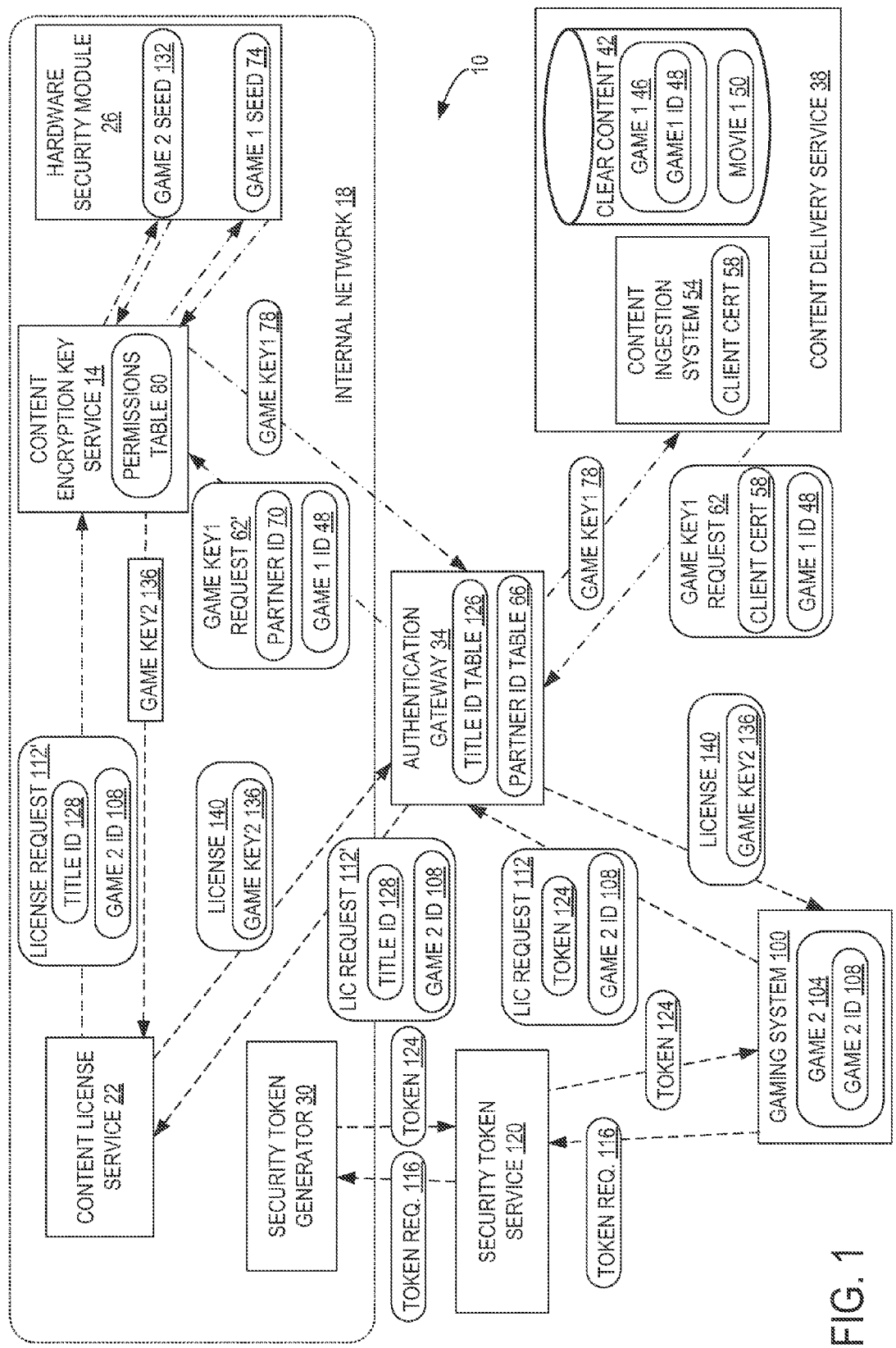
FIG. 1 is a schematic view of a content encryption key management system according to an embodiment of the present disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included herein are schematic and generally not drawn to scale. Rather, the various drawing scales, aspect ratios, and numbers of components shown in the figures may be purposely distorted to make certain features or relationships easier to see.

FIG. 1 is a schematic view of one embodiment of a content encryption key management system 10 for managing a content encryption key and a seed that is used to generate the content encryption key. The content encryption key management system 10 may include a content encryption key service 14 that may be located within an internal network 18 running on one or more servers. The internal network may comprise, for example, a local area network (LAN), wide area network (WAN), personal area network (PAN), or a combination thereof.

As described in more detail below, in one example a content license service 22, a hardware security module 26, and a security token generator 30 may also be located within the internal network 18. Additionally, the content encryption key management system 10 may communicate with an authentication gateway 34 outside the internal network 18 via another network, such as a separate LAN, WAN, PAN, or a combination thereof, and including the Internet.

The content encryption key service 14 may comprise a content encryption key program that comprises instructions that may be stored in mass storage of a computing device. The content encryption key program may be loaded into memory and executed by a processor of the computing device to perform one or more of the methods and processes described in more detail below. Similarly, the content license service 22 may comprise a content license service program that may be stored in mass storage of a computing device, loaded into memory and executed by a processor of the computing device. Similarly, the security token generator 30 may comprise a security token generator program that may be stored in mass storage of a computing device, loaded into memory and executed by a processor of the computing device. Similarly, the authentication gateway 34 may comprise an authentication gateway program that may be stored in mass storage of a computing device, loaded into memory and executed by a processor of the computing device.

The above-referenced computing devices may take the form of a desktop computer, network computer, server, or other suitable type of computing device. Additional details regarding the components and computing aspects of the above-referenced computing devices are described in more detail below with reference to FIG. 4.

With continued reference to FIG. 1, a content delivery service 38 may include a clear content database 42 that includes unencrypted digital content. The content delivery service 38 may be operated within a closed-wall garden, or a network that is insulated from any external connection, save a single node. For the purpose of illustration, in one example the unencrypted digital content may include a copy of the Game 1 video game program 46. The copy of the Game 1 video game program 46 may also include a seed identifier 48 having a designation "Game 1 ID" that identifies and corresponds to a seed that is uniquely associated with the content delivery service 38 and/or the Game 1 video game program 46. The content delivery service 38 may also have one or more additional seeds that are also uniquely associated with the content delivery service 38. As another example, the unencrypted digital content may also include other digital assets, such as a motion picture entitled "Movie 1" 50.

The content delivery service may also include a content ingestion system 54 that may receive digital content from external sources via a secure network connection. Administrators of the content delivery service 38 may desire to encrypt their copy of the Game 1 video game program 46 and make it available in encrypted form to customers. To perform the encryption, the content delivery service 38 may request a content encryption key from the content encryption key service 14 via the authentication gateway 34.

The content ingestion system 54 may be pre-provisioned with a client certificate 58. The client certificate may take the form of a Secured Sockets Layer (SSL) or Transport Layer Security (TLS) certificate, or other suitable cryptographic protocol certificate. In one example, upon establishing appropriate authentication with the content delivery service 38, the content encryption key service 14 via authentication gateway 34 may pre-provision the client certificate 58 to the content delivery service. As explained in more detail below, the client certificate 58 may facilitate subsequent authentication and establishment of trust between the content ingestion system 54 and the authentication gateway 34.

The content ingestion system 54 may format a request to receive a content encryption key to be used to encrypt the Game 1 video game program 46 using the seed corresponding to the Game 1 ID seed identifier. In one example, the request may take the form of a Game Key1 Request 62 that includes the client certificate 58, the Game 1 ID seed identifier 48 (i.e., the name of the seed from which a content encryption key is requested to be derived), and a publicly known identifier of the Game 1 video game program 46. In other examples, the body of the request may also include additional data, such as the number of content keys requested, the length of the content key(s) requested (such as 128 bit, 256 bit, etc.), and/or the type of encryption protocol requested (such as Advanced Encryption Standard (AES), SHA-2, etc).

The request may be sent to the authentication gateway 34, which may reside outside the internal network 18 (as shown in FIG. 1) or, in other examples, inside the internal network 18. The authentication gateway 34 may use the client certificate 58 to authenticate the identity of the content delivery service 38 and related content ingestion system 54 using, for example, a mutual authentication process, such as mutual SSL/TLS.

The authentication gateway 34 may include a Partner ID table 66 that contains specific identity tags, or Partner IDs, that are associated with services, business partners, client partners, and/or other entities that desire to interact with the content encryption key service 14. In one example, the Partner ID table 66 may contain a single specific Partner ID that corresponds to each such entity. Accordingly, for each request received from a given entity, the authentication gateway 34 may insert the same specific Partner ID corresponding to that entity into the request that is forwarded to the content encryption key service 14.

Upon authenticating the identity of the content delivery service 38 and related content ingestion system 54, the authentication gateway 34 may associate the client certificate 58 with a requesting entity fingerprint. In one example, the requesting entity fingerprint may comprise a Partner Identification (ID) 70 that is uniquely associated with the content delivery service 38 and content ingestion system 54. The authentication gateway 34 may then insert the Partner ID 70 into a modified Game Key1 Request 62' that is formatted according to a communication protocol that may be utilized by the content encryption key service 14. In one example, the authentication gateway 34 may insert the Partner ID 70 into the http header of the modified Game Key1 Request 62'.

Upon receiving the modified Game Key1 Request 62', the content encryption key service 14 may map the Game 1 ID seed identifier 48 to a corresponding Game 1 seed 74. The content encryption key service 14 may also map the Partner ID 70 to a corresponding seed permission in a permissions table 80. In one example, the permissions table may include data related to entities that may interact with the content encryption key service 14 such as, for example, which seed(s) controlled by the content encryption key service 14 a particular entity may access, parameters of such access, and/or other permissions. In this manner, the content encryption key service 14 may determine whether the corresponding seed permission in the permissions table 80 entitles the content ingestion system 54 and content delivery service 38 to receive a content encryption key that is generated using the Game 1 seed 74.

As shown in FIG. 1, the content encryption key management system 10 may include a hardware security module 26 to store the seeds. In one example, only the content encryption key service 14 may access the hardware security module 26. Further, the content encryption key service 14 and hardware security module 26 may be configured such that the content encryption key service 14 may not access the actual value of the seeds, but may only utilize the seeds to generate content encryption keys.

Where the content encryption key service 14 determines that the corresponding seed permission in the permissions table 80 entitles the content ingestion system 54 and content delivery service 38 to receive a content encryption key that is generated using the Game 1 seed 74, the content encryption key service 14 may derive a Game Key1 content encryption key 78 using the Game 1 seed 74. The content encryption key service 14 may then forward the Game Key1 content encryption key 78 to the authentication gateway 34. The authentication gateway 34 may then forward the Game Key1 content encryption key 78 to the content ingestion system 54. The content ingestion system 54 may then utilize the Game Key1 content encryption key to encrypt the Game 1 video game program 46.

In another example, and with continued reference to FIG. 1, a gaming system 100 may include a copy of a video game program, such as the Game 2 video game program 104. The copy of the Game 2 video game program 104 may also include a seed identifier, such as a "Game 2 ID" seed identifier 108, that identifies and corresponds to a seed that is uniquely associated with the gaming system 100 and/or the Game 2 video game program 104.

The gaming system 100 may be configured to communicate with an online gaming system platform via a network, such as the Internet. In this manner, users of the gaming system 100 may communicate and play multi-player games with other players via the Internet. Users of the gaming system 100 may also purchase and download additional digital content related to video games, such as game-related items, costumes, levels, etc. In other examples, users of the gaming system 100 may purchase licenses that provide access to additional, encrypted content contained in the video game programs.

In one example, a user of the gaming system 100 playing the Game 2 video game program 104 may desire to access additional game levels of the video game. To access such levels, the gaming system 100 may construct and send a license request 112 to the online gaming system platform. The license request 112 may request an encryption key for unencrypting the desired levels.

In one example, the gaming system 100 may first send a token request 116 to a security token service 120. The token request 116 may contain, for example, information related to the gaming system 100 and/or the user(s) of the gaming system that may be used by the security token service to authorize access to the online gaming system platform. Upon confirming the token request 116, the security token service may issue a security token 124 to the gaming system 100.

The gaming system 100 may format the license request 112 to contain one or more policies that comprise name/value pairs. For example an expiration date of the license may be paired with a value of such date, such as Dec. 12, 2013. The license request 112 may also include the security token 124 and the Game 2 ID seed identifier 108. The gaming system 100 may forward the license request 112 to the authentication gateway 34.

The authentication gateway 34 may include a Title ID table 126 that contains specific identity tags, or Title IDs, that are associated with particular digital content assets containing encrypted content for which the content encryption key service 14 may provide encryption keys. In one example, the Title ID table 126 may contain a single specific Title ID that corresponds to each such digital content asset. Accordingly, for each request received that relates to a particular digital content asset, the authentication gateway 34 may insert the same specific Title ID corresponding to that digital asset into the request that is forwarded to the content encryption key service 14 via the content license service 22.

The authentication gateway 34 may use the security token 124 to verify the authenticity of the Game 2 video game program 104 that generated the request. Upon verifying such authenticity, the authentication gateway 34 may associate the particular digital content asset referenced in the security token 124, in this example the Game 2 video game program 104, with a requesting entity fingerprint. In one example, the requesting entity fingerprint may comprise a Title ID 128 that is uniquely associated with the Game 2 video game program 104. The authentication gateway 34 may then insert the Title ID 128 into a modified License Request 112' that is formatted according to a communication protocol that may be utilized by the content license service 22 and the content encryption key service 14. In one example, the authentication gateway 34 may insert the Title ID 128 into the http header of the modified License Request 112'.

The authentication gateway 34 may forward the modified License Request 112' to the content license service 22. The content license service 22 may then forward the modified License Request 112' to the content encryption key service 14. Upon receiving the modified License Request 112', the content encryption key service 14 may map the Game 2 ID seed identifier 108 to a corresponding Game 2 seed 132.

The content encryption key service 14 may also map the Title ID 128 to a corresponding seed permission in the permissions table 80. In one example, the permissions table may include data related to particular digital content assets such as, for example, which seed(s) controlled by the content encryption key service 14 may be utilized by a particular digital content asset to access encrypted portions of such asset, parameters of such access, and/or other permissions. In this manner, the content encryption key service 14 may determine whether the corresponding seed permission in the permissions table 80 entitles the Game 2 video game program 104 to receive a content encryption key that is generated using the Game 2 seed 132.

Where the content encryption key service 14 determines that the corresponding seed permission in the permissions table 80 entitles the Game 2 video game program 104 to receive a content encryption key that is generated using the Game 2 seed 132, the content encryption key service 14 may derive a Game Key2 content encryption key 136 using the Game 2 seed 132. The content encryption key service 14 may then forward the Game Key2 content encryption key 136 to the content license service 22. The content license service 22 may construct a license 140 that includes the Game Key2 content encryption key 136.

In one example, the content license service 22 may configure the license 140 and embedded Game Key2 content encryption key 136 to be device-bound to the particular computing device on which the gaming system 100 is running. In this manner, only the gaming system 100 may utilize the license 140 and Game Key2 content encryption key 136 with the particular copy of the Game 2 video game program 104 that is running on the gaming system 100. In one example, the content license service 22 may device-bind the Game Key2 content encryption key 136 to the gaming system 100 by including the public key associated with the gaming system 100 in the license 140.

The content license service may forward the license 140 and embedded Game Key2 content encryption key 136 to the authentication gateway 34. The authentication gateway 34 may then forward the license 140 and embedded Game Key2 content encryption key 136 to the gaming system 100. The gaming system 100 may then utilize the Game Key2 content encryption key to decrypt the additional game levels of the Game 2 video game program 104.

Figure 2:
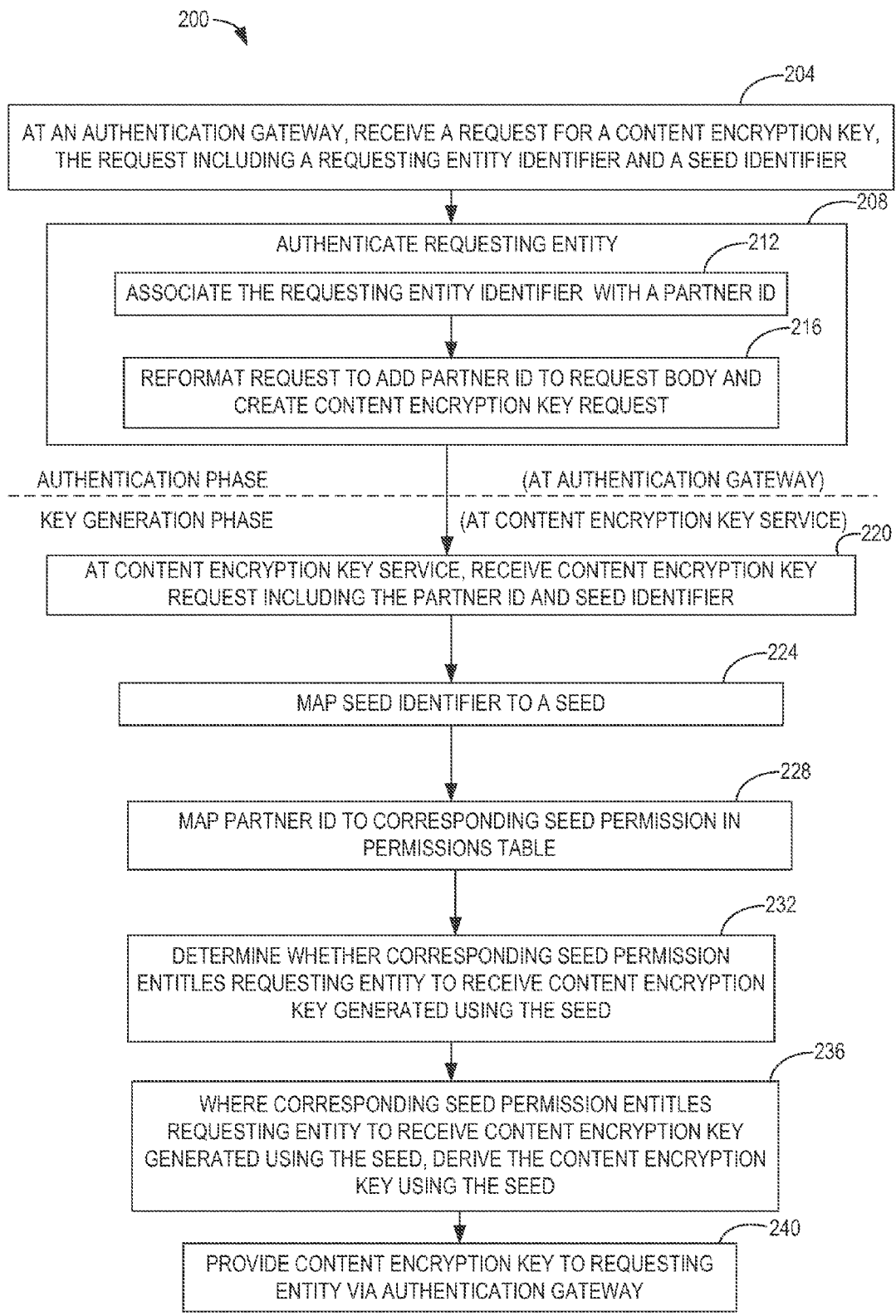
FIG. 2 is a flow chart of a method for providing a content encryption key that is generated using a seed according to one embodiment of the present disclosure

FIG. 2 illustrates a flow chart of a method 200 for managing a content encryption key and a seed that is used to generate the content encryption key according to an embodiment of the present disclosure. The following description of method 200 is provided with reference to the software and hardware components of the content encryption key management system 10 described above and shown in FIG. 1. It will be appreciated that method 200 may also be performed in other contexts using other suitable hardware and software components.

With reference to FIG. 2, at 204 the method may include receiving a request for a content encryption key, such as the Game Key1 content encryption key 78 or the Game Key2 content encryption key 136, at the authentication gateway 34. The request may include a requesting entity identifier and a seed identifier. At 208 the method may include authenticating the requesting entity that provided the content encryption key request. In one example, at 212 the method may include associating the requesting entity identifier with a Partner ID. At 216 the method may include reformatting the content encryption key request to add the Partner ID to the body of the request and create a modified content encryption key request.

At 220, the method may include receiving the content encryption key request at the content encryption key service 14, with the content encryption key request including the Partner ID and seed identifier. At 224 the method may include mapping the seed identifier to a seed. At 228 the method may include mapping the Partner ID to a corresponding seed permission in a permissions table. As noted above, in one example the seed may be located in a hardware security module 26 that is physically separate from the computing device on which the content encryption key service 14 is running.

At 232 the method may include determining whether the corresponding seed permission entitles the requesting entity to receive the content encryption key that is generated using the seed. At 236, where the corresponding seed permission entitles the requesting entity to receive the content encryption key that is generated using the seed, the method may include deriving the content encryption key using the seed. At 240, the method may include providing the content encryption key to the requesting entity via the authentication gateway 34.

Figure 3A:
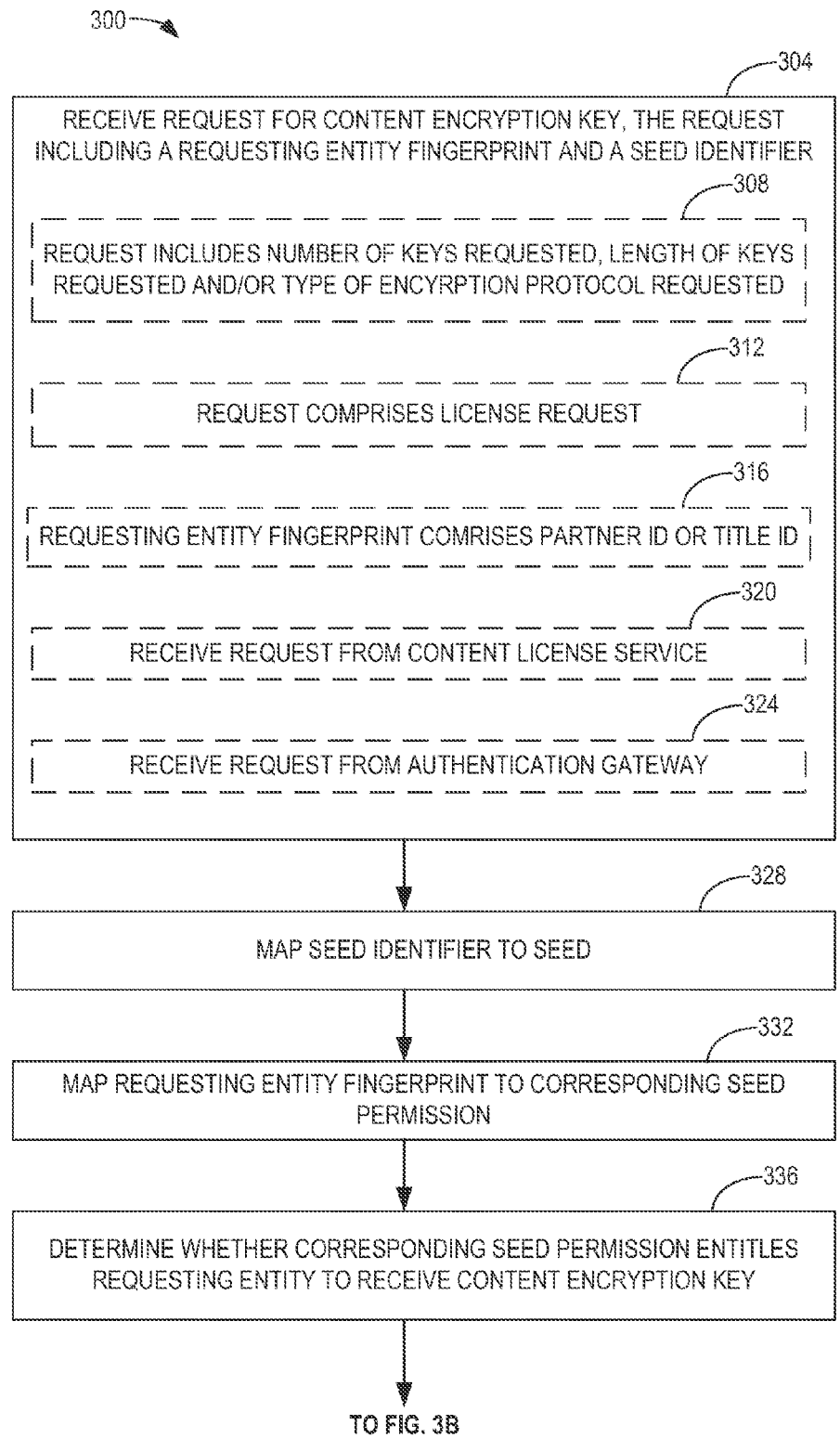
FIGS. 3A and 3B are a flow chart of a method for providing a content encryption key that is generated using a seed according to one embodiment of the present disclosure.
Figure 3B:
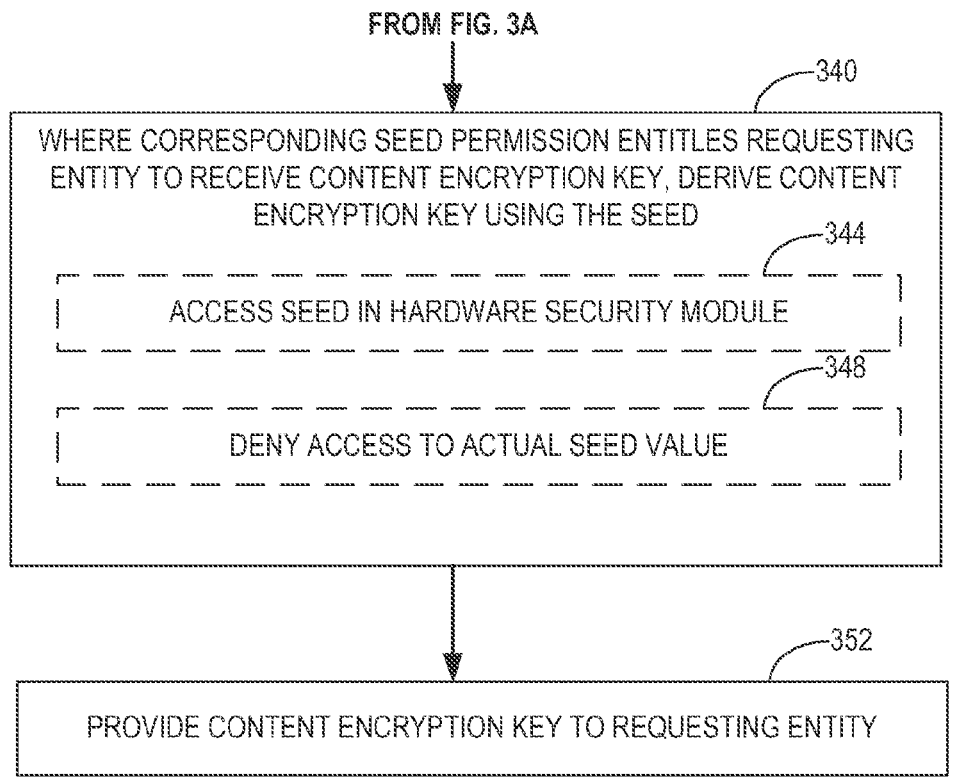

FIGS. 3A and 3B illustrates a flow chart of a method 300 for managing a content encryption key and a seed that is used to generate the content encryption key according to another embodiment of the present disclosure. The following description of method 300 is provided with reference to the software and hardware components of the content encryption key management system 10 described above and shown in FIG. 1. It will be appreciated that method 300 may also be performed in other contexts using other suitable hardware and software components.

With reference to FIG. 3A, at 304 the method may include receiving a request for a content encryption key, with the request including a requesting entity fingerprint that corresponds to a requesting entity and a seed identifier that corresponds to a seed. At 308 the request may include one or more of a number of content encryption keys requested, a length of the content encryption key requested, and a type of encryption protocol requested. At 312 the request may comprise a license request for additional content.

At 316 the requesting entity fingerprint may comprise a partner identification that is associated with a content delivery service, or a title identification that is associated with a video game program. At 320 the method 300 may include receiving the request from a content license service. At 324 the method 300 may include receiving the request from an authentication gateway.

At 328 the method may include mapping the seed identifier to a seed. At 332 the method may include mapping the requesting entity fingerprint to a corresponding seed permission. At 336 the method may include determining whether the corresponding seed permission entitles the requesting entity to receive the content encryption key.

With reference now to FIG. 3B, at 340, where the corresponding seed permission entitles the requesting entity to receive the content encryption key, the method may include deriving the content encryption key using the seed. At 344 the method may include accessing the seed in a hardware security module. At 348 the method may include denying access to an actual seed value of the seed in the hardware security module. At 352, the method may include providing the content encryption key to the requesting entity.

In some embodiments, the above described methods and processes may be tied to a computing system including one or more computers. In particular, the methods and processes described herein may be implemented as a computer application, computer service, computer API, computer library, and/or other computer program product.

Figure 4:
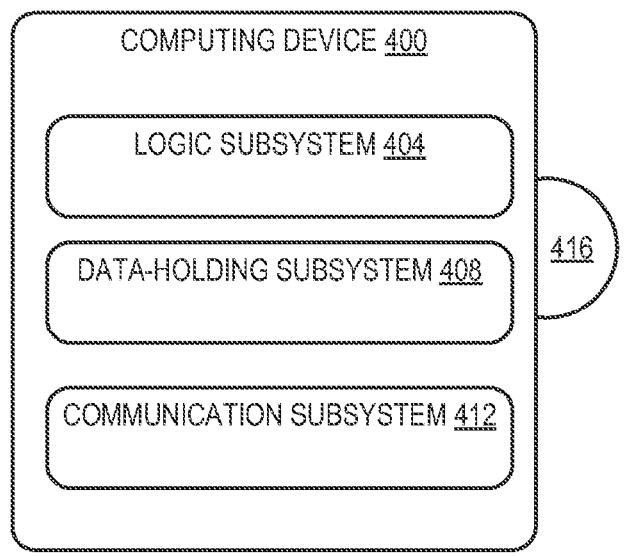
FIG. 4 is a simplified schematic illustration of an embodiment of a computing device.

FIG. 4 schematically shows a nonlimiting embodiment of a computing device 400 that may perform one or more of the above described methods and processes. Computing device 400 is shown in simplified form. It is to be understood that virtually any computer architecture may be used without departing from the scope of this disclosure. In different embodiments, computing device 400 may take the form of a mainframe computer, server computer, desktop computer, laptop computer, tablet computer, home entertainment computer, network computing device, mobile computing device, mobile communication device, gaming device, etc.

As shown in FIG. 4, computing device 400 includes a logic subsystem 404, a data-holding subsystem 408, and a communication subsystem 412. Computing device 400 may optionally include other subsystems and components not shown in FIG. 4. Computing device 400 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 404 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 404 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 408 may include one or more physical, non-transitory devices configured to hold data and/or instructions executable by the logic subsystem 404 to implement the herein described methods and processes. When such methods and processes are implemented, the state of data-holding subsystem 408 may be transformed (e.g., to hold different data). Data-holding subsystem 408 may include mass storage.

Data-holding subsystem 408 may include removable media and/or built-in devices. Data-holding subsystem 408 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 408 may include devices with one or more of the following characteristics: volatile, nonvolatile, dynamic, static, read/write, read-only, random access, sequential access, location addressable, file addressable, and content addressable. In some embodiments, logic subsystem 404 and data-holding subsystem 408 may be integrated into one or more common devices, such as an application specific integrated circuit or a system on a chip.

FIG. 4 also shows an aspect of the data-holding subsystem 408 in the form of removable computer-readable storage media 416, which may be used to store and/or transfer data and/or instructions executable to implement the methods and processes described herein. Removable computer-readable storage media 416 may take the form of CDs, DVDs, HD-DVDs, Blu-Ray Discs, EEPROMs, and/or floppy disks, among others.

It is to be appreciated that data-holding subsystem 408 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

Communication subsystem 412 may be configured to communicatively couple computing device 400 with one or more networks and/or one or more other computing devices. Communication subsystem 412 may include wired and/or wireless communication devices compatible with one or more different communication protocols. As nonlimiting examples, the communication subsystem 412 may be configured for communication via a wireless telephone network, a wireless local area network, a wired local area network, a wireless wide area network, a wired wide area network, etc. In some embodiments, the communication subsystem may allow computing device 400 to send and/or receive messages to and/or from other devices via a network such as the Internet.

The terms "module" and "program," may be used to describe an aspect of the content encryption key management system 10 that is implemented to perform one or more particular functions. In some cases, such a module or program may be instantiated via logic subsystem 404 executing instructions held by data-holding subsystem 408. It is to be understood that different modules and programs may be instantiated from the same application, service, code block, object, library, routine, API, function, etc. Likewise, the same module or program may be instantiated by different applications, services, code blocks, objects, routines, APIs, functions, etc. The terms "module" and "program," are meant to encompass individual or groups of executable files, data files, libraries, drivers, scripts, database records, etc.

It is to be appreciated that a "service", as used herein, may be an application program that is executable across multiple user sessions and available to one or more system components, programs, and/or other services. In some implementations, a service may run on a server responsive to a request from a client.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for managing a content encryption key and a seed that is used to generate the content encryption key, the method executed by a content encryption key service comprising a computing device with a processor, the method comprising:
   receiving by the computing device a request for the content encryption key from a requesting entity, the request including a requesting entity fingerprint that corresponds to the requesting entity and a seed identifier that corresponds to the seed, the request including at least one parameter selected from the group consisting of (a) a number of content encryption keys requested and (b) a length of the content encryption key requested;
   mapping by the computing device the seed identifier to the seed;
   mapping by the computing device the requesting entity fingerprint to a corresponding seed permission in a permissions table;
   determining by the computing device whether the corresponding seed permission entitles the requesting entity to receive the content encryption key that is generated using the seed;
   where the corresponding seed permission entitles the requesting entity to receive the content encryption key that is generated using the seed, deriving by the computing device the content encryption key using the seed; and
   providing by the computing device the content encryption key to the requesting entity.

2. The method of claim 1, wherein the request comprises a license request for content.

3. The method of claim 1, wherein the requesting entity fingerprint comprises a partner identification that is associated with a content delivery service.

4. The method of claim 1, wherein the requesting entity fingerprint comprises a title identification that is associated with a video game program.

5. The method of claim 1, further comprising accessing the seed in a hardware security module.

6. The method of claim 5, further comprising denying access to an actual seed value of the seed in the hardware security module.

7. The method of claim 1, wherein receiving a request for the content encryption key comprises receiving the request from a content license service.

8. The method of claim 1, wherein receiving a request for the content encryption key comprises receiving the request from an authentication gateway.

9. A content encryption key management system for managing a content encryption key and a seed that is used to generate the content encryption key, the content encryption key management system comprising:
   a computing device with a processor;

a content encryption key program comprising instructions stored in a mass storage of the computing device, the content encryption key program executable by the processor to:
- receive a request for the content encryption key from a requesting entity, the request including a requesting entity fingerprint that corresponds to the requesting entity and a seed identifier that corresponds to the seed, the seed identifier including a name of the seed from which a content encryption key is requested to be derived, the seed identifier being associated with a program or a device of the requesting entity;
- map the seed identifier to the seed;
- map the requesting entity fingerprint to a corresponding seed permission in a permissions table;
- determine whether the corresponding seed permission entitles the requesting entity to receive the content encryption key that is generated using the seed;
- where the corresponding seed permission entitles the requesting entity to receive the content encryption key that is generated using the seed, derive the content encryption key using the seed; and
- provide the content encryption key to the requesting entity.

10. The content encryption key management system of claim 9, wherein the request includes one or more of a number of content encryption keys requested, a length of the content encryption key requested, and a type of encryption protocol requested.

11. The content encryption key management system of claim 9, wherein the request comprises a license request for content.

12. The content encryption key management system of claim 9, wherein the requesting entity fingerprint comprises a partner identification that is associated with a content delivery service.

13. The content encryption key management system of claim 9, wherein the requesting entity fingerprint comprises a title identification that is associated with a video game program.

14. The content encryption key management system of claim 9, wherein the content encryption key program is further configured to access the seed in a hardware security module.

15. The content encryption key management system of claim 14, wherein the content encryption key program is further configured to deny access to an actual seed value of the seed in the hardware security module.

16. The content encryption key management system of claim 9, wherein the content encryption key program is further configured to receive the request from a content license service.

17. The content encryption key management system of claim 9, wherein the content encryption key program is further configured to receive the request from an authentication gateway.

18. A method for managing a content encryption key and a seed that is used to generate the content encryption key, the method executed by a content encryption key service comprising a computing device with a processor, the method comprising:
- receiving by the computing device a request for the content encryption key from a requesting entity, the request including a requesting entity fingerprint that corresponds to the requesting entity and a seed identifier that corresponds to the seed, the request including at least one parameter selected from the group consisting of (a) a number of content encryption keys requested and (b) a length of the content encryption key requested;
- mapping by the computing device the seed identifier to the seed;
- mapping by the computing device the requesting entity fingerprint to a corresponding seed permission in a permissions table;
- determining by the computing device whether the corresponding seed permission entitles the requesting entity to receive the content encryption key that is generated using the seed;
- where the corresponding seed permission entitles the requesting entity to receive the content encryption key that is generated using the seed, accessing the seed in a hardware security module;
- utilizing by the computing device the seed to derive the content encryption key while denying access to an actual seed value of the seed; and
- providing by the computing device the content encryption key to the requesting entity.

* * * * *